(12) United States Patent
Pagaime da Silva et al.

(10) Patent No.: US 9,135,212 B2
(45) Date of Patent: Sep. 15, 2015

(54) SYSTEM AND METHOD FOR REGISTERING AN ELECTRONIC DEVICE

(71) Applicant: Google Inc., Mountain View, CA (US)

(72) Inventors: Joao Paulo Pagaime da Silva, Munich (DE); Kenneth Edward Mixter, Santa Clara, CA (US); Raymond Lo, Kirkland, WA (US); Glenn Wilson, Los Angeles, CA (US); William Alexander Drewry, Nashville, TN (US); Bin Zhao, Sammamish, WA (US); Sumit Gwalani, Mountain View, CA (US); Mattias Stefan Nissler, Hamburg (DE)

(73) Assignee: Google Inc., Mountain View, CA (US)

( * ) Notice: Subject to any disclaimer, the term of this patent is extended or adjusted under 35 U.S.C. 154(b) by 305 days.

(21) Appl. No.: 13/691,635

(22) Filed: Nov. 30, 2012

(65) Prior Publication Data

US 2015/0212971 A1    Jul. 30, 2015

(51) Int. Cl.
*G06F 15/177*  (2006.01)
*H04L 29/06*  (2006.01)

(52) U.S. Cl.
CPC .......... *G06F 15/177* (2013.01); *H04L 63/083* (2013.01); *H04L 63/0823* (2013.01)

(58) Field of Classification Search
CPC .. G06F 9/4411; H04L 63/083; H04L 63/0823
USPC ........................................................ 709/220
See application file for complete search history.

(56) References Cited

U.S. PATENT DOCUMENTS

| | | | |
|---|---|---|---|
| 7,685,414 B1 | 3/2010 | Appenzeller et al. | |
| 7,703,128 B2 | 4/2010 | Cross et al. | |
| 2008/0097783 A1* | 4/2008 | Iannacci | 705/1 |
| 2009/0119190 A1* | 5/2009 | Realini | 705/30 |
| 2012/0254762 A1* | 10/2012 | Parmar et al. | 715/736 |

* cited by examiner

*Primary Examiner* — Yves Dalencourt
(74) *Attorney, Agent, or Firm* — McDermott Will & Emery LLP

(57) ABSTRACT

A system and a method for registering an electronic device are provided. An auto-enrollment status of an electronic device by an enterprise is determined based on hash information associated with an identifier for the electronic device. In a case where the auto-enrollment status of the electronic device is determined to require auto-enrollment of the electronic device by the enterprise, one or more configuration settings for the electronic device as designated by the enterprise are identified, and the electronic device is requested to adopt the one or more configuration settings as designated by the enterprise in response to providing the auto-enrollment login interface to the electronic device.

18 Claims, 10 Drawing Sheets

600

| | |
|---|---|
| [Hash for Client ID 1] | [Message for Client ID 1] |
| [Hash for Client ID 2] | [Message for Client ID 2] |
| [Hash for Client ID 3] | [Message for Client ID 3] |
| [Hash for Client ID 4] | [Message for Client ID 4] |
| [Hash for Client ID 5] | [Message for Client ID 5] |
| [Hash for Client ID 6] | [Message for Client ID 6] |
| [Hash for Client ID 7] | [Message for Client ID 7] |
| [Hash for Client ID 8] | [Message for Client ID 8] |
| [Hash for Client ID 9] | [Message for Client ID 9] |
| [Hash for Client ID 10] | [Message for Client ID 10] |
| [Hash for Client ID 11] | [Message for Client ID 11] |
| . . . | |

[Hash for Client ID 1]
[Hash for Client ID 2]
[Hash for Client ID 4]
[Hash for Client ID 6]
[Hash for Client ID 7]
[Hash for Client ID 9]
[Hash for Client ID 10]
[Hash for Client ID 19]
[Hash for Client ID 22]
[Hash for Client ID 25]

SYSTEM AND METHOD FOR REGISTERING AN ELECTRONIC DEVICE

BACKGROUND

The subject technology generally relates to registering an electronic device, and in particular, relates to automatically enrolling an electronic device to an enterprise.

Electronic devices are often manually registered. However, registering electronic devices to an enterprise can be time consuming and labor intensive, where the amount of labor and time required is proportional to the number of electronic devices that need to be registered.

SUMMARY

The disclosed subject technology relates to a computer-implemented method for registering an electronic device. The method comprises determining, based on hash information associated with an identifier for the electronic device, an auto-enrollment status of the electronic device by an enterprise. In a case where the auto-enrollment status of the electronic device is determined to require auto-enrollment of the electronic device by the enterprise, the method further comprises identifying one or more configuration settings for the electronic device as designated by the enterprise, and requesting the electronic device to adopt the one or more configuration settings as designated by the enterprise.

The disclosed subject technology relates to a computer-implemented method for registering an electronic device. The method comprises receiving an indication to configure an electronic device. The method further comprises providing hash information associated with an identifier for the electronic device to determine an auto-enrollment status of the electronic device by an enterprise. The method further comprises receiving an indication of the auto-enrollment status of the electronic device by the enterprise. In a case where the electronic device is indicated to require auto-enrollment of the electronic device by the enterprise, the method further comprises receiving one or more configuration settings as designated by the enterprise, and automatically configuring the electronic device based on the received one or more configuration settings as designated by the enterprise.

The disclosed subject technology further relates to a system for registering an electronic device. The system includes one or more processors, and a machine-readable medium including instructions stored therein, which when executed by the processors, cause the processors to perform operations comprising determining, based on hash information associated with an identifier for the electronic device, an auto-enrollment status of the electronic device by an enterprise. In a case where the auto-enrollment status of the electronic device is determined to require auto-enrollment of the electronic device by the enterprise, the operations further comprise identifying one or more configuration settings for the electronic device as designated by the enterprise and requesting the electronic device to adopt the one or more configuration settings as designated by the enterprise. In a case where the auto-enrollment status of the electronic device is determined not to require auto-enrollment of the electronic device by the enterprise, the operations further comprise generating, based on the identifier of the electronic device and hash information associated with the identifier, a response identifier for the electronic device, and transmitting the generated response identifier to the electronic device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

It is to be understood that both the foregoing general description and the following detailed description are exemplary and explanatory and are intended to provide further explanation of the subject technology as claimed.

BRIEF DESCRIPTION OF THE DRAWINGS

Certain features of the subject technology are set forth in the appended claims. However, for purpose of explanation, several embodiments of the subject technology are set forth in the following figures.

FIG. 3A is a diagram illustrating an example communication generated based on an identifier, in accordance with aspects of the subject technology.

FIG. 3B is a diagram illustrating an example communication generated based on an identifier, in accordance with aspects of the subject technology.

DETAILED DESCRIPTION

Figure 1:
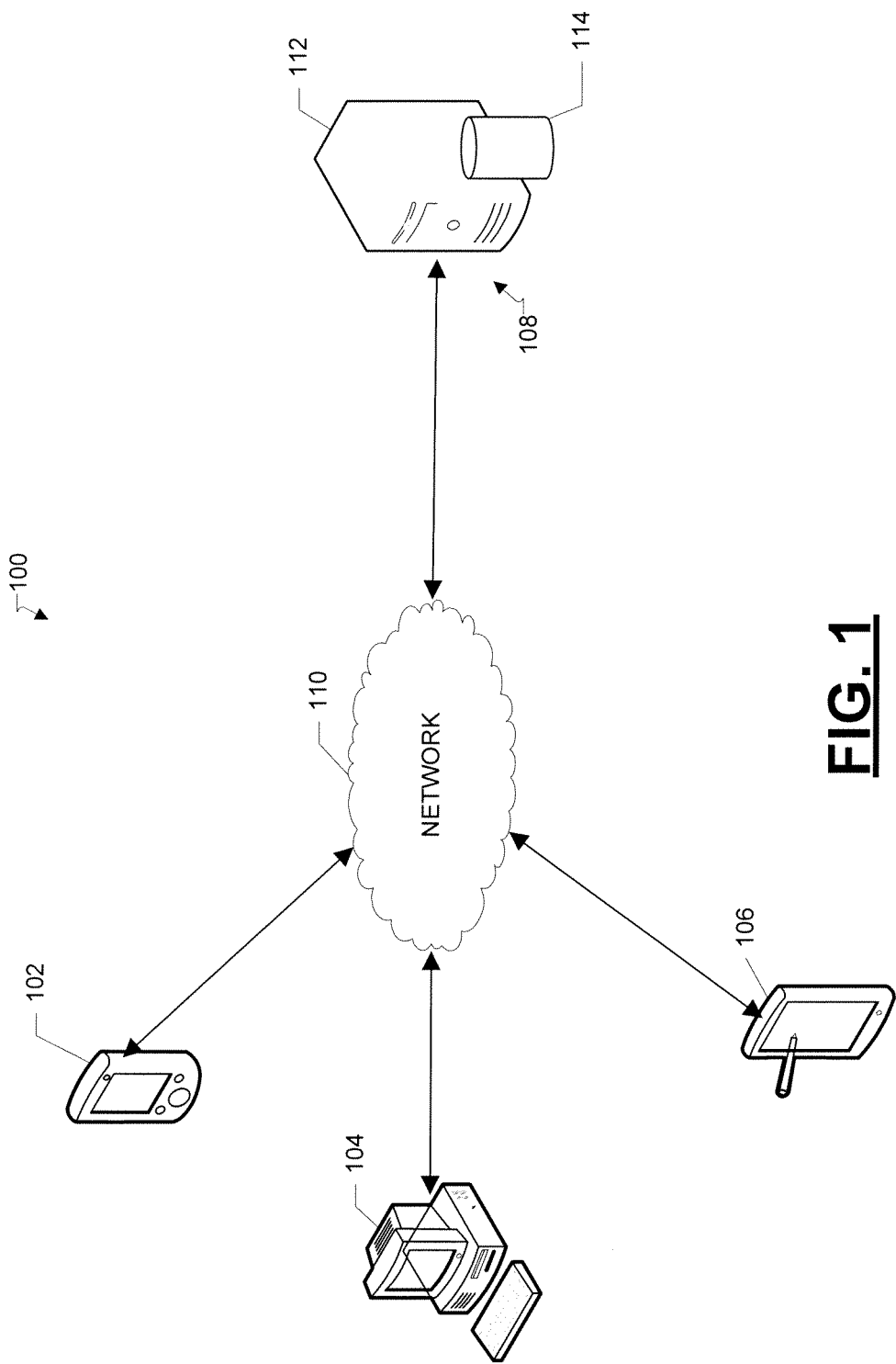
FIG. 1 illustrates an example network environment for registering an electronic device.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

A system and a method for registering an electronic device are provided. An indication to configure an electronic device is received by the electronic device. In example aspects, the indication is generated in response to a user action (e.g., powering on the electronic device for the first time, etc.). An identifier for the electronic device and hash information associated with the identifier are then generated. The identifier and the hash information are based on an unique identifier of the electronic device that is hardcoded onto the electronic device and is used to determine an auto-enrollment status of the electronic device. The identifier and hash information are provided to a server to determine if the electronic device is required to be auto-enrolled by an enterprise.

The server contains auto-enrollment information for multiple enterprises. On the server side, a determination of the auto-enrollment status of the electronic device is made based on the received identifier and the hash information. If the auto-enrollment status of the electronic device is determined to require auto-enrollment of the electronic device by an enterprise, configuration settings for the electronic device as designated by the enterprise are identified. An auto-enrollment login interface is provided to the electronic device, and the electronic device is requested to adopt the configuration settings as designated by the enterprise. Examples of configuration settings include but are not limited to hardware configurations, application configurations, etc. The electronic device is then requested to be configured to adopt the set of configuration settings for the enterprise. According to example aspects, the enterprise may also require the electronic device to run specific applications and/or remove specific applications. In that regard, a request for the electronic device to install or uninstall specific applications as designated by the enterprise is also provided to the electronic device.

A response identifier may be generated and provided to the electronic device. Values of the response identifier may be based on the determined auto-enrollment status of the electronic device. In example aspects, if the electronic device is determined not to require auto-enrollment, then the response indicator does not contain a hash value.

If the electronic device is indicated to require auto-enrollment by an enterprise, an auto-enrollment interface is displayed on the electronic device. The electronic device also receives configurations settings as designated by the enterprise and is automatically configured based on the received configuration settings as designated by the enterprise. The auto-enrollment process can take place without any additional user action. Alternatively, if the electronic device is not indicated to require auto-enrollment, the electronic device may be manually registered and/or configured.

FIG. 1 illustrates an example network environment for registering an electronic device. A network environment 100 includes electronic devices 102, 104, and 106 communicably connected to a server 108 by a network 110. Server 108 includes a processing device 112 and a data store 114. Processing device 112 executes computer instructions stored in data store 114, for example, to request electronic device 102, 104, or 106 to initiate an auto-enrollment process.

In some example aspects, each of electronic devices 102, 104, and 106, is associated with an identifier and hash information based on the identifier. Electronic devices 102, 104, and 106 can be mobile devices (e.g., smartphones, tablet computers, PDAs, and laptop computers), portable media players, desktop computers or other appropriate computing devices. In the example of FIG. 1, electronic device 102 is depicted as a smartphone, electronic device 104 is depicted as a desktop computer, and electronic device 106 is depicted as a tablet computer.

Server 108 may be any system or device having a processor, memory, and communications capability to determine auto-enrollment status of electronic device 102, 104, or 106 by an enterprise, and to provide electronic device 102, 104, or 106 with configuration settings as designated by the enterprise. Server 108 may be a single computing device such as a computer server. Server 108 may also represent more than one computing device working together to perform the actions of a server computer.

Server 108 includes a processing device 112 and a data store 114. Processing device 112 executes computer instructions stored in a computer-readable medium, for example, to determine auto-enrollment status of electronic device 102, 104, or 106.

According to example aspects, an indication to configure electronic device 102, 104, or 106 is received by the electronic device. This indication may be generated in response to the electronic device being turned on for the first time. Electronic device 102, 104, 106 then provides an identifier for the electronic device and hash information associated with the identifier to server 108 to determine an auto-enrollment status of the electronic device by an enterprise.

Server 108, determines, based on hash information associated with the received identifier for electronic device 102, 104, or 106, an auto-enrollment status of electronic device 102, 104, or 106 by an enterprise. Electronic device 102, 104, or 106 is identified by its hash information during the auto-enrollment process in order to account for user privacy. In a case where the auto-enrollment status of the electronic device is determined to require auto-enrollment of the electronic device by the enterprise, server 108 identifies one or more configuration settings for the electronic device as designated by the enterprise. Server 108 requests electronic device 102, 104, or 106 to adopt the one or more configuration settings as designated by the enterprise. According to example aspects, server 108 provides for display, an auto-enrollment login interface to electronic device 102, 104, or 106 and requests electronic device 102, 104, or 106 to adopt the one or more configuration settings as designated by the enterprise in response to providing the auto-enrollment login interface to the electronic device.

Electronic device 102, 104, or 106, upon receipt of a request to adopt the one or more configuration settings as designated by the enterprise, receives one or more configuration settings as designated by the enterprise. Electronic device 102, 104, or 106 is then automatically configured based on the received one or more configuration settings as designated by the enterprise. According to example aspects, an auto-enrollment login interface for electronic device 102, 104, or 106 is displayed on the electronic device if the electronic device is indicated to require auto-enrollment by the enterprise. The auto-enrollment login interface may prompt entry of a user authentication to initiate auto-enrollment of electronic device 102, 104, or 106. In this case, the one or more configuration settings as designated by the enterprise is received by electronic device 102, 104, or 106 in response to entry of the user authentication and electronic device 102, 104, or 106 is then automatically configured based on the received one or more configuration settings as designated by the enterprise.

Network 110 can include, for example, any one or more of a cellular network, a satellite network, a personal area network (PAN), a local area network (LAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
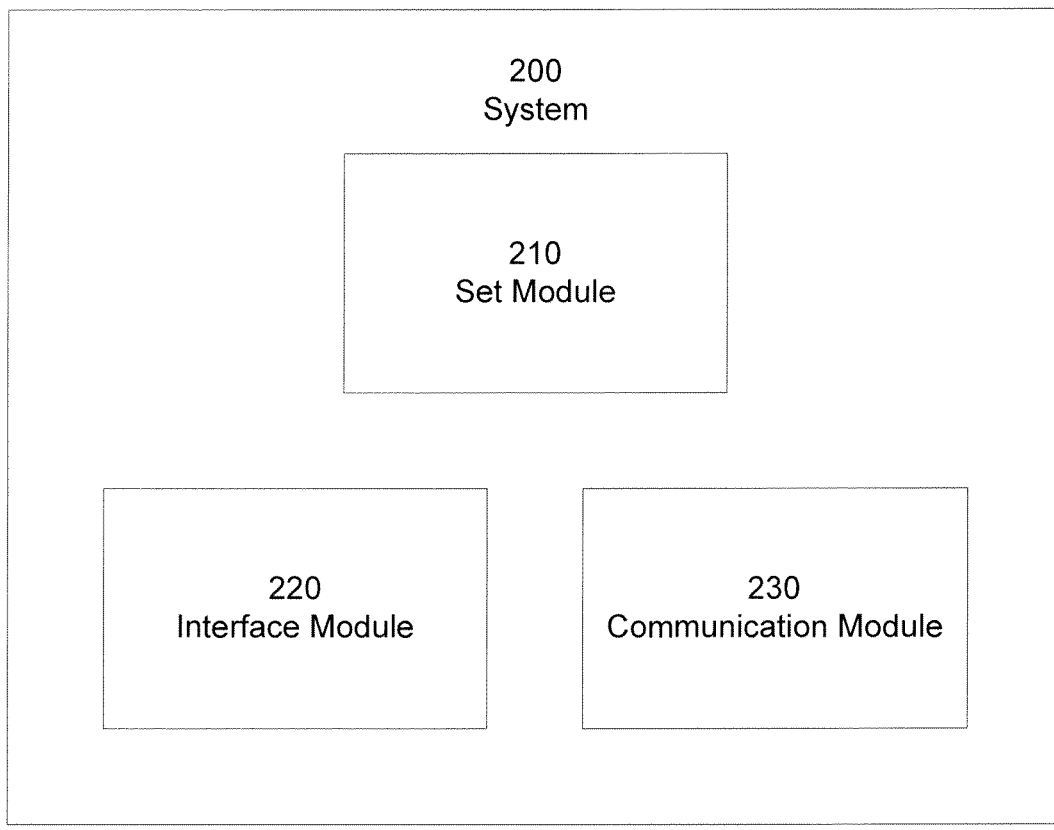
FIG. 2 is a block diagram illustrating an example system configured to generate a reply to an electronic device based on an identifier, in accordance with various aspects of the subject technology.

FIG. 2 is a block diagram illustrating an example system 200 configured to generate a reply to an electronic device based on an identifier, in accordance with various aspects of the subject technology. The system 200 may be embodied in, for example, server 108 of FIG. 1 and may include a set module 210, an interface module 220, and a communication module 230. While the system 200 is shown in one configuration in FIG. 2, in other configurations, the system 200 may include additional, alternative, and/or fewer components.

The set module 210 may be configured to keep track of associations between identifiers (identifiers for electronic devices 102, 104, and 106) and sets. For example, the set module 210 may store a record, for each set, that includes a reference to the identifiers in the set. The set module may also, or instead, store a record, for each identifier, that includes a reference to an identifier for the set that the identifier is associated with.

According to example aspects, the set module 210 may obtain a list of identifiers (e.g., identification numbers, serial numbers, client names, or other identifiers for the electronic devices or users) and assign some or all of the identifiers to one or more sets. The set module 210 may assign an identifier to a set by, for example, calculating a hash of the identifier by running a hash function on the identifier and performing a modulus operation on the hash of the identifier based on the number of sets available. The resulting number may correspond to a set that the identifier is to be assigned to or associated with.

Any number of hash functions may be used. For example, the set module may use a secure hash function (e.g., SHA-0, SHA-1, SHA-2, SHA-3, etc.) of varying block sizes (e.g., SHA-256 using 256 bits, SHA-512 using 512 bits, etc.) or any other cryptographic hash function. A hash function is used to identify the electronic device in order to protect identity of the electronic device during the auto-enrollment process. The interface module 210 may be configured to communicate with one or more electronic devices or servers. For example, the interface module may receive a communication that includes an identifier from an electronic device. In response to receiving the communication from the electronic device, the communication module 230 may generate a response to the electronic device based on the identifier.

The response may include a message or other information that is appropriate for all electronic devices associated with the identifier to receive. For example, the electronic devices associated with the identifier may be a particular group of electronic devices that share one or more characteristics. The communication module 230 may generate and transmit a message to the electronic devices based on the one or more characteristics.

In example aspects, the electronic devices may be assigned to identifiers randomly (e.g., the members of the set may not have any logical connection to one another) and the communication module 230 may generate a message to electronic devices associated with a particular identifier. In such cases, the response may contain a potentially different message directed to each electronic device associated with the identifier.

In example aspects, the communication module 230 may generate and transmit messages directed towards a subset (e.g., one or more, but not all) of the electronic devices associated with the identifier. Additional aspects of communications (e.g., responses) to electronic devices are discussed below with respect to FIG. 3A and FIG. 3B.

In example aspects, the communication 300 may include messages for electronic devices associated with identifiers in the set that may be used to configure an electronic device. For example, a message may include an indication a configuration type that an electronic device is to be configured to operate as. When an electronic device receives the communication, the electronic device may identify a configuration type in a message directed to the electronic device based on its identifier and execute one or more configuration processes based on the configuration type.

According to example aspects, a message corresponding to an entity (e.g., an electronic device) associated with a particular identifier included in the communication 300 may be encrypted using an encryption key that is available to the entity associated with the identifier. Accordingly, other parties that obtain the communication 300 may not be able to decipher the message. Instead, only the entity associated with the identifier with access to the encryption key may be able to decrypt the message and use the message in additional operations.

The communication to the electronic device need not include messages to electronic devices associated with the identifier. For example, FIG. 3B is a diagram illustrating an example communication 350 generated based on an identifier, in accordance with example aspects of the subject technology. The communication 350 may be generated based on a request from an electronic device and may include a listing of one or more identifiers associated with the identifier or hashes for the one or more identifiers.

According to example aspects, the one or more identifiers may be a subset of all of the identifiers associated with the identifier that are selected based on, for example, one or more characteristics associated with the identifiers. For example the communication 350 may include hashes for identifiers that are of a certain configuration type (e.g., enterprise electronic devices, personal electronic devices, professional edition, limited edition, etc.).

When an electronic device receives the communication 350, the electronic device may determine whether the hash for the electronic device's identifier (e.g., serial number) is listed in the communication 350. Based on whether or not the hash for the electronic device's identifier is in the communication 350, the electronic device may be configured to perform one or more operations.

For example, if the hash is found in the communication 350, the electronic device may determine that the electronic device is of a particular configuration type (e.g., enterprise electronic device) and execute one or more operations or processes associated with that particular configuration type (e.g., configuration processes). Accordingly, the electronic device may run one or more processes designed to configure the electronic device to operate as the particular configuration type of machine (e.g., enterprise electronic device).

If the hash is not found in communication 350, the electronic device may determine that the electronic device is not of a particular configuration type (e.g., enterprise electronic device) or of another configuration type (e.g., personal electronic device) and execute other operations or processes. Accordingly, the electronic device may run other processes designed to configure the electronic device to operate as another configuration type of machine (e.g., a default configuration type).

Figure 4:
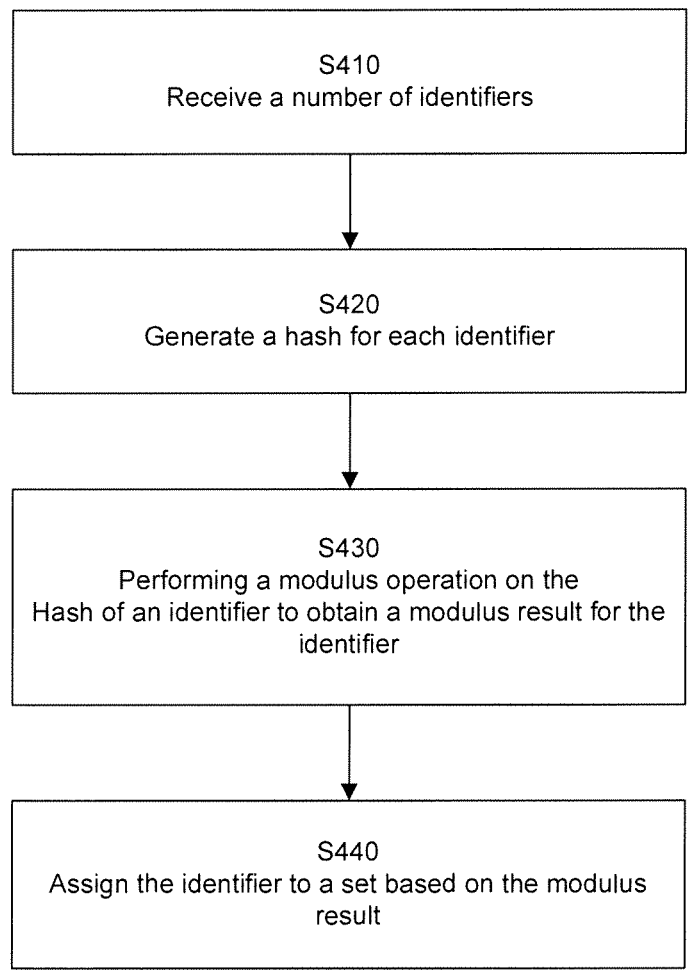
FIG. 4 is a flow diagram illustrating an example process for assigning identifiers to a set, in accordance with aspects of the subject technology.

FIG. 4 is a flow diagram illustrating an example process 400 for assigning identifiers to a set. Although the operations in process 400 are shown and described in a particular order, certain operations may be performed in different orders or at the same time.

At block S410, the server receives a number of identifiers (e.g., IDs of electronic devices 102, 104, and 106) to be assigned to sets. The identifiers may be, according to example aspects, identifiers for all electronic devices that have been purchased or for electronic devices of a certain type (e.g., a enterprise machine that is to be configured in a specific manner).

To assign each of the identifiers to a set, the server generates a hash for each identifier at block S420 by applying a hash function to the identifier. At block S430, the server performs a modulus operation on the hash of each identifier based on the number of sets that are to have identifiers assigned to them.

The modulus operation on the hash for an identifier results in a modulus result for the identifier that, at block S440, are used to assign the identifier to a set. For example, the server may assign the identifier to a set that has an identifier (e.g., a set ID) that corresponds to the modulus result for the identifier. In example aspects, the identifier is assigned to the set by storing an association of the identifier with the identifier of the set in a data repository. The stored association may then be used in communications between the electronic device and the server.

Figure 5:
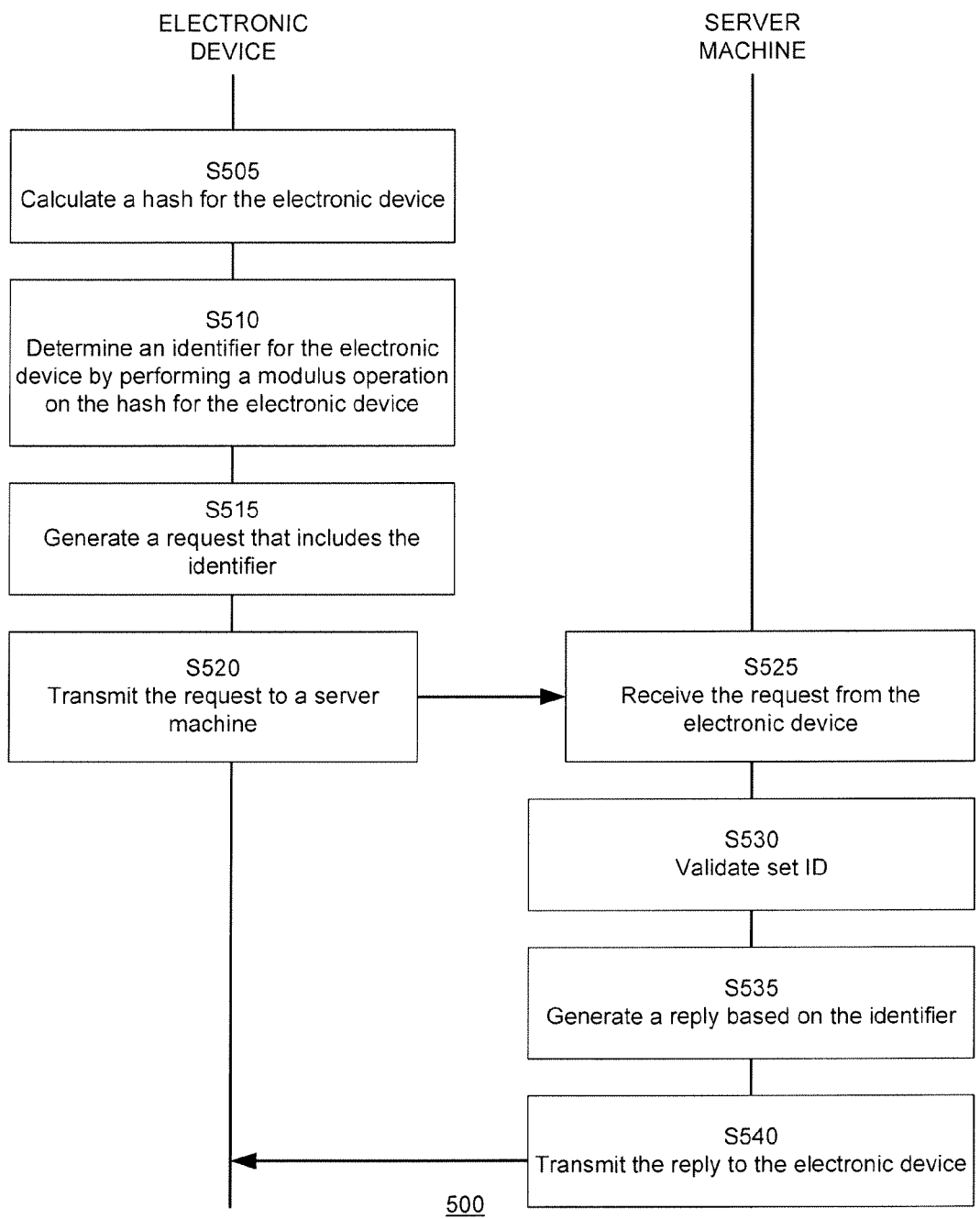
FIG. 5 is a flow diagram illustrating an example process for communicating between an electronic device and a server using an identifier, in accordance with various aspects of the subject technology.

FIG. 5 is a flow diagram illustrating an example process 500 for communicating between an electronic device and a server using an identifier, in accordance with various aspects of the subject technology. Although the operations in process 500 are shown and described in a particular order, certain operations, may be performed in different orders or at the same time.

An electronic device may have access to an identifier associated with the electronic device or a user of the electronic device. For example, an identifier (e.g., the serial number) may be stored on the electronic device when the electronic device is manufactured or transmitted to the electronic device during another process.

At block S505, the electronic device calculates a hash by running a hash function on the electronic device's identifier. At block S510, the identifier is determined by performing a modulus operation on the hash based on a number of sets (e.g., an expected total number of sets).

At block S515, the electronic device generates a communication that includes the identifier (e.g., the set ID) and transmits the communication to a server at block S520. The communication may be a request for instructions, a request for information needed for a particular process, or any other communication. The communication may also include additional data that may be used to validate the identifier such as, as will be discussed in further detail below, an expected total number of sets or the modulus value used to determine the identifier. In another example, the communication may be the identifier itself.

At block S525, the server receives the communication from the electronic device and validate the identifier. In some cases, the identifier for the electronic device may no longer be valid because the identifier may have been generated based on an expected number of sets that is no longer current. For example, the server may have increased the number of sets used because of a growing number of identifiers being tracked by the server (e.g., the number of sets may have increased from 16 to 32).

The server may reassign identifiers to the increased number of sets using a larger modulus (e.g., 32) based on the increased number of sets. However, the modulus used by the electronic device to calculate the identifier may be still be based on an outdated number of sets (e.g., 16). Accordingly the identifier for the electronic device may no longer be current.

To validate the identifier, at block 5530, the server compares the validating information received from the electronic device (e.g., the modulus value that the electronic device used to determine the identifier) with validating information stored at the server (e.g., the modulus number in use by the server).

If validating information does not match, the identifier received from the electronic device is most likely invalid. In response, the server may transmit an updated modulus to the electronic device. The electronic device may recalculate the identifier using the updated modulus and transmit the recalculated identifier to the server.

On the other hand, if the modulus number received from the electronic device and the modulus number in use by the server match, the identifier received from the electronic device is most likely valid and, at block 5535, the server may generate a reply communication based on the identifier.

At block 5540, the server transmits the reply communication to the electronic device. The reply communication may also be sent to a number of other electronic devices associated with the same identifier. For example, if another electronic device associated with the same identifier initiates communication with the server, the server may send the same reply communication to the other electronic device because it is associated with the same identifier.

The reply communication may include references to a number of identifiers (e.g., hashes of the identifiers or the identifiers themselves) and messages corresponding to each of the references that enable an electronic device associated with the identifier to determine which message to use. The message may be used by the electronic device for some other purpose or in another process being performed by the electronic device.

In example aspects, the reply communication may include references to a number of identifiers without any additional messages. Electronic devices may use the reply communication to determine, for example, whether the electronic device belongs to a particular group of electronic devices, whether the electronic device is associated with a particular characteristic, or whether the electronic device is to execute a particular process.

According to some aspects, the reply communication may be used to include information that may be used to configure an electronic device. For example, a manufacturer may make a number of electronic devices with the same system image (e.g., firmware, operating system, applications, etc.) and different serial numbers on the electronic devices, which may also be visible on packaging for the electronic devices. The system image may include different instructions or processes that may be able to configure each electronic device in several different ways.

When the electronic devices are sold or distributed, they may be distributed as different versions. The different versions may include different levels (e.g., a "premium level," a "gold level," "silver level," or a "default level") or different types (e.g., an "enterprise version," a "personal version," etc.). A retailer or other distributor may scan or otherwise input the serial number for an electronic device along with the appropriate version and send the information to a server (e.g., a configuration system).

When an electronic device is powered on, the electronic device may send a communication that includes an identifier to the server. Based on the identifier, the server will transmit a reply communication to the electronic device that may be used by the electronic device to determine which configuration instructions or processes to execute. For example, the reply communication may include a message that instructs the electronic device to execute configuration instructions for a particular version.

In another example, the reply communication may include a list of references to serial numbers (e.g., hashes of serial numbers) for electronic devices of a particular version. If a reference to the electronic device's serial number is included in the list, the electronic device may execute configuration instructions for the particular version.

According to example aspects of the subject technology, by loading a single system image for a number of different versions, manufacturers may be able to simplify the design and manufacturing processes for electronic devices. Furthermore, the privacy of users of electronic devices may be protected by using an identifier to communicate with the server instead of other identifying information.

Figure 6A:
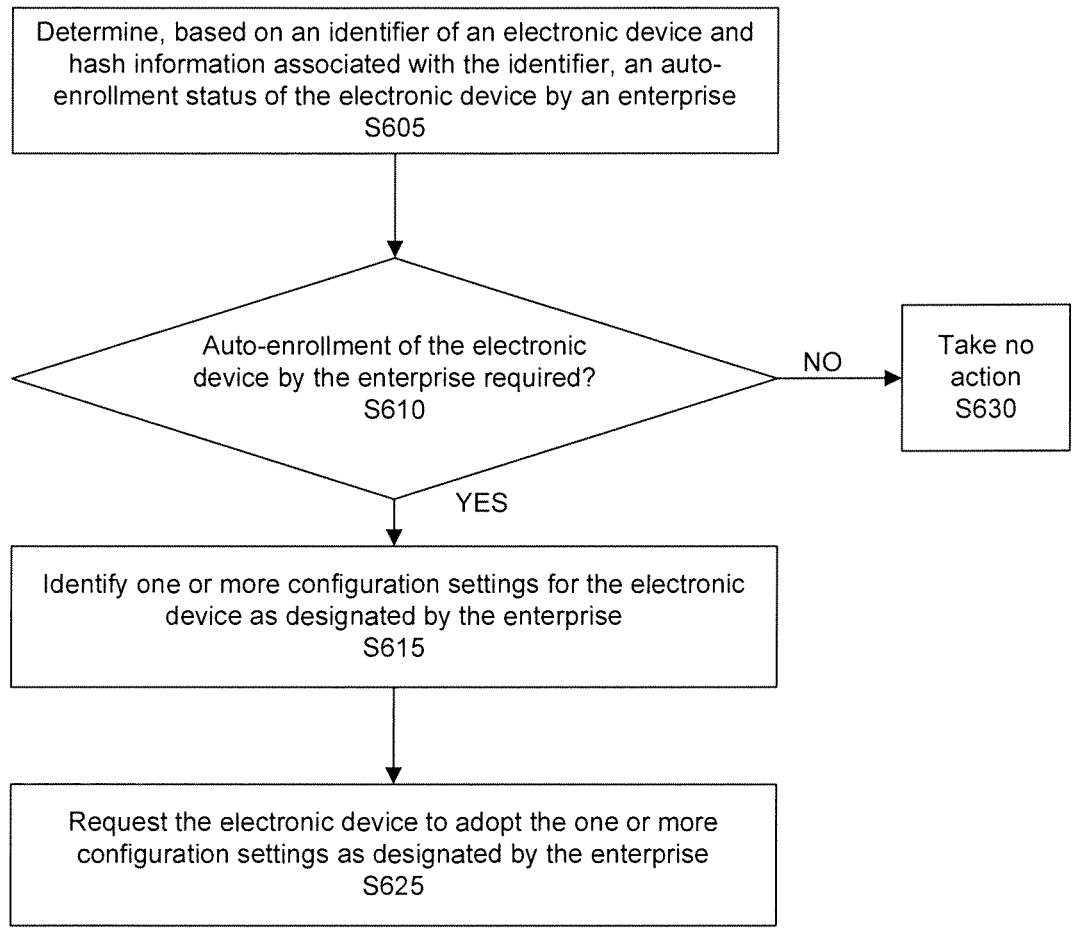
FIG. 6A illustrates an example process for registering an electronic device.

FIG. 6A illustrates an example process for registering an electronic device. Although the operations in process 600 are shown in a particular order, certain operations may be performed in different orders or at the same time. In addition, although process 600 is described with reference to the system of FIG. 1, process 600 is not limited to such and can be performed by other system(s).

In block S605, auto-enrollment status of electronic device 106 is determined based on hash information associated with an identifier for electronic device 106. In order to account for user privacy, electronic device 102, 104, or 106 is identified by its hash information during the auto-enrollment process. According to example aspects, the hash information is generated by a secure hash algorithm (e.g., SHA-1, SHA-2, SHA-3, etc.). In block S610, if auto-enrollment of the electronic device by the enterprise is required, the process proceeds to block S615, where one or more configuration settings for the electronic device as designated by the enterprise are identified.

In block 5625, electronic device 106 is requested to adopt the one or more configuration settings (e.g., configuration settings that are configured to modify hardware configuration settings of the electronic device, configuration settings that are configured to modify software configuration settings of the electronic device, etc.) as designated by the enterprise. The configuration settings for an enterprise may be different based on the type of the electronic device that is being configured.

According to example aspects, an auto-enrollment login interface is provided for display on the electronic device. A user of the electronic device is prompted to provide user authentication to initiate auto-enrollment of the electronic device by the enterprise via the auto-enrollment interface. The electronic device is then requested to adopt the one or more configuration settings as designated by the enterprise in response to receiving the user authentication. According to other example aspects, an auto-enrollment login interface is not provided and the electronic device is automatically requested to adopt configuration settings as designated by the enterprise once the configuration settings have been identified. Alternatively, in block S610, if auto-enrollment of the electronic device by the enterprise is not required, the process proceeds to block S630, and no further action is taken.

According to example aspects, if the auto-enrollment status of the electronic device is determined not to require auto-enrollment of the electronic device by the enterprise, a response identifier is generated based on the identifier of the electronic device and hash information associated with the identifier. The generated response identifier is then transmitted to electronic device 106.

Figure 6B:
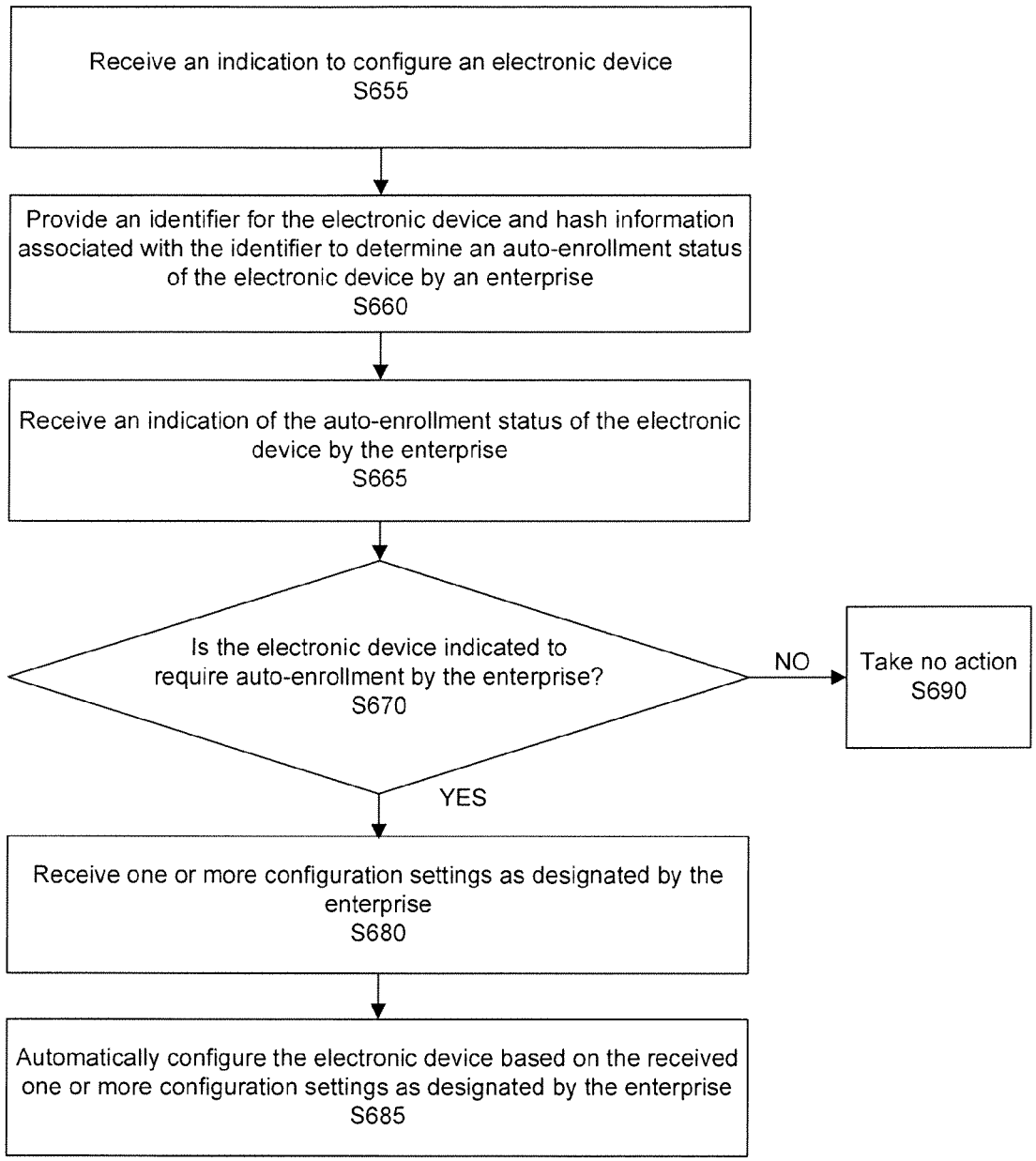
FIG. 6B illustrates another example process for registering an electronic device.

FIG. 6B illustrates another example process for registering an electronic device. Although the operations in process 650 are shown in a particular order, certain operations may be performed in different orders or at the same time. In addition, although process 650 is described with reference to the system of FIG. 1, process 650 is not limited to such and can be performed by other system(s).

In block S655, an indication to configure electronic device 106 is received. In block S660, hash information associated with an identifier for the electronic device is provided to determine an auto-enrollment status of the electronic device by an enterprise. According to example aspects, the hash information is generated by a secure hash algorithm (e.g., SHA-1, SHA-2, SHA-3, etc.). In block S665, an indication of the enrollment status of the electronic device by the enterprise is received. In block S670, if the electronic device is indicated to require auto-enrollment by the enterprise, the process proceeds to block S680, where one or more configuration settings as designated by the enterprise are received. In block 5685, electronic device 106 is automatically configured based on the received one or more configuration settings as designated by the enterprise. Hardware and/or software settings of the electronic device may be modified based on the received one or more configuration settings as designated by the enterprise.

According to example aspects, an auto-enrollment login interface is displayed on electronic device 106 if the electronic device is indicated to require auto-enrollment of the electronic device by the interface. A user of electronic device 106 is prompted to provide user authentication via the auto-enrollment login interface to initiate auto-enrollment of the electronic device by the enterprise. The electronic device is then automatically configured based on the received one or more configuration setting as designated by the enterprise in response to receiving the user authentication. Alternatively, in block S670, if the electronic device is not indicated to require auto-enrollment by the enterprise, the process proceeds to block 5690 and no further action is taken. According to example aspects, if the electronic device is indicated to require auto-enrollment of the electronic device by a different enterprise, the identifier for the electronic device and the hash information associated with the identifier are updated. The updated identifier for electronic device 106 and the hash information associated with the identifier are then provided to server 108 to determine the auto-enrollment status of the electronic device.

Figures 7A, 7B:
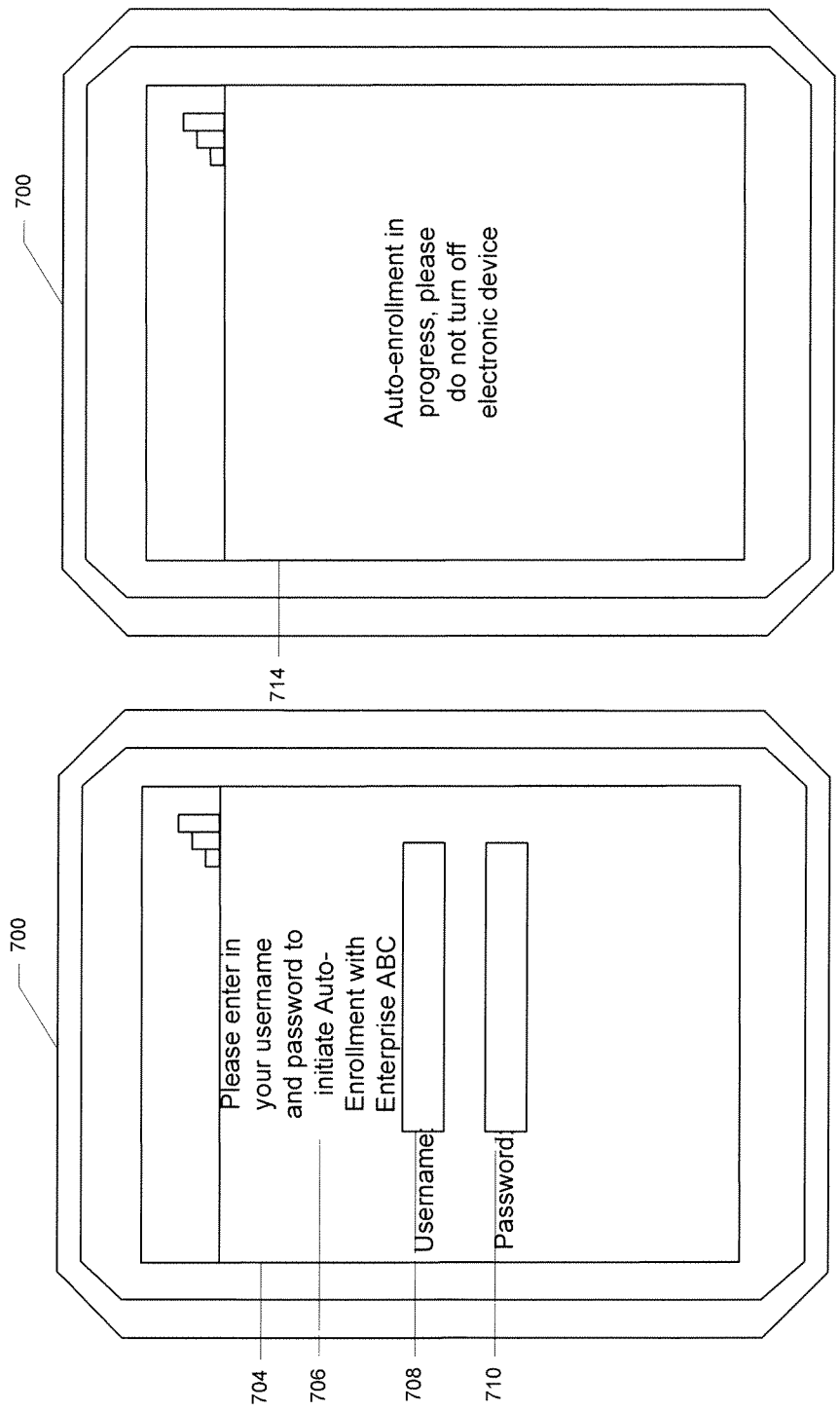
FIG. 7A illustrates an example screenshot of an auto-enrollment interface during the auto-enrollment process.
FIG. 7B illustrates another example screenshot of an auto-enrollment interface during the auto-enrollment process.

FIG. 7A illustrates an example screenshot of an auto-enrollment interface during the auto-enrollment process. As shown in FIG. 7A, auto-enrollment interface 704 is displayed on display screen of tablet computer. Input boxes 708 and 710 are provided for display and are configured to allow a user to authenticate the user's credentials to initiate auto-enrollment of tablet computer 700.

FIG. 7B illustrates another example screenshot of an auto-enrollment interface during the auto-enrollment process. As shown in FIG. 7B, auto-enrollment interface 714 contains a notification message that is displayed on auto-enrollment interface 714 while the auto-enrollment process is in progress. In a case where user credentials are required to initiate the auto-enrollment process, auto-enrollment of tablet computer 306 is initiated after authentication of the user credentials. Additional examples of auto-enrollment interfaces that provide different notification messages may also be provided for display. During this process, tablet computer 306 automatically receives configuration settings as designated by the enterprise and adopts the received configuration settings. The user is not required to take any additional action to complete the auto-enrollment process.

Figure 7C:
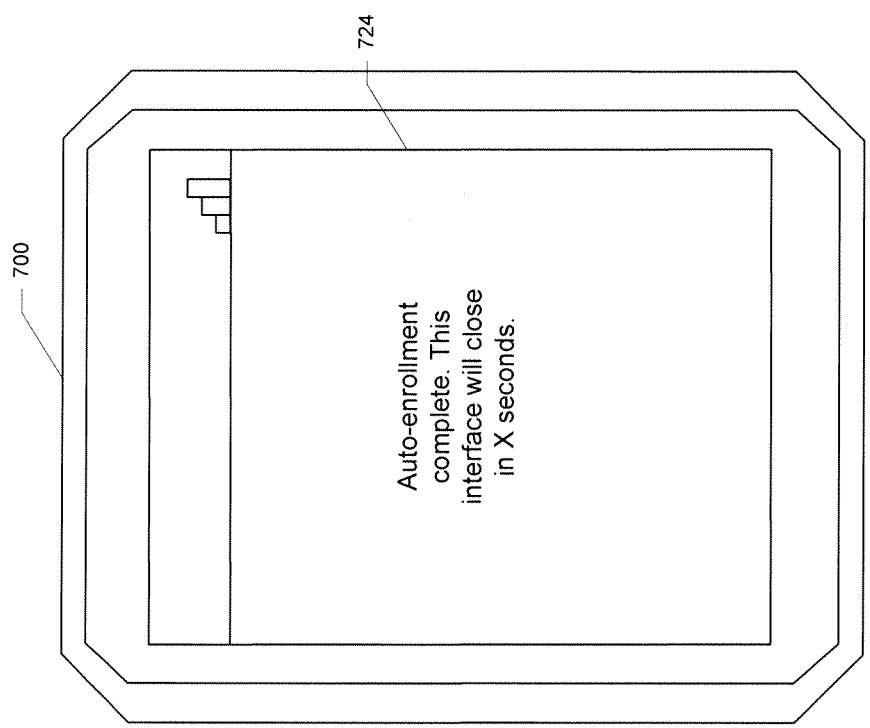
FIG. 7C illustrates an example screenshot of an auto-enrollment interface upon completion of the auto-enrollment process.

FIG. 7C illustrates an example screenshot of an auto-enrollment interface upon completion of the auto-enrollment process. As shown in FIG. 7C, auto-enrollment interface 724 contains a notification message that is displayed on auto-enrollment interface 724 after the auto-enrollment process is complete. Additional examples of auto-enrollment interfaces that provide different notification messages regarding the completion of the auto-enrollment process may be provided for display.

Figure 8:
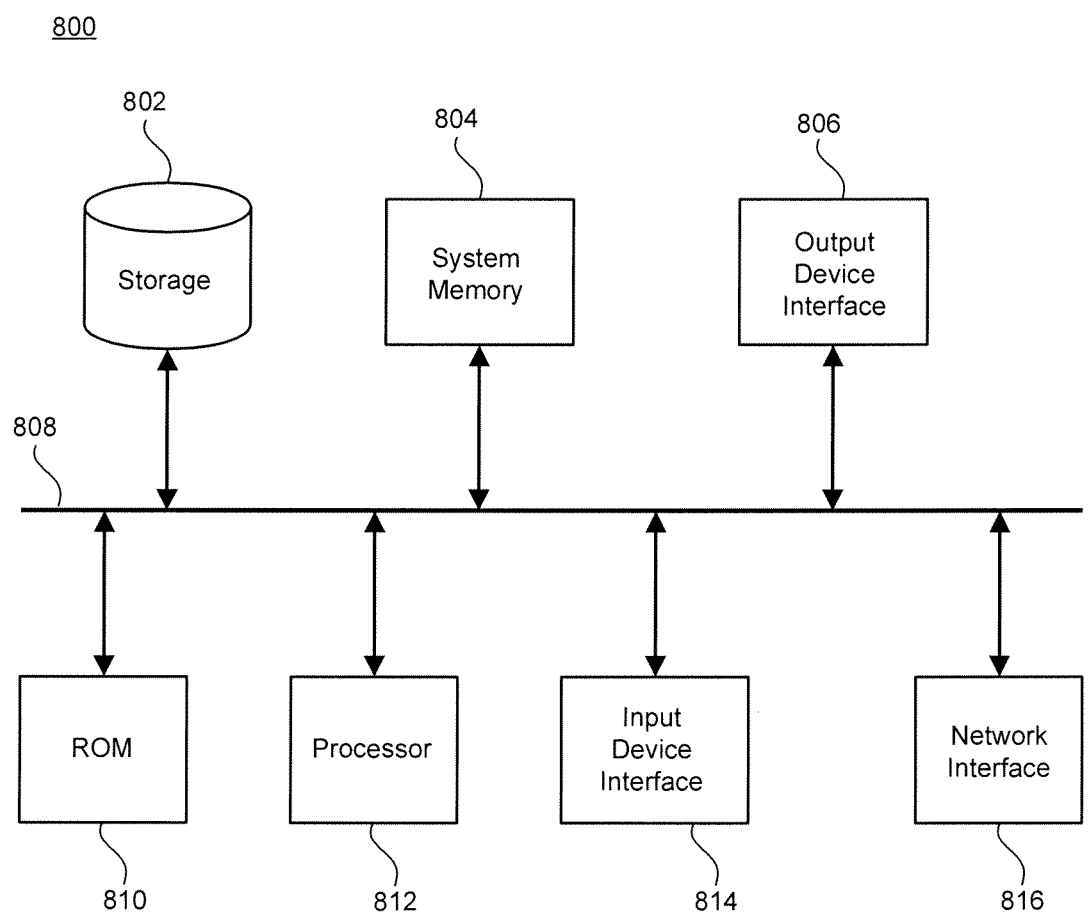
FIG. 8 conceptually illustrates an electronic system with which some implementations of the subject technology are implemented.

FIG. 8 conceptually illustrates an electronic system with which some implementations of the subject technology are implemented. Electronic system 800 can be a laptop computer, a desktop computer, smartphone, PDA, a tablet computer or any other sort of device 102, 104, and 106. Such an electronic system includes various types of computer readable media and interfaces for various other types of computer readable media. Electronic system 800 includes a bus 808, processing unit(s) 812, a system memory 804, a read-only memory (ROM) 810, a permanent storage device 802, an input device interface 814, an output device interface 806, and a network interface 816.

Bus 808 collectively represents all system, peripheral, and chipset buses that communicatively connect the numerous internal devices of electronic system 800. For instance, bus 808 communicatively connects processing unit(s) 812 with ROM 810, system memory 804, and permanent storage device 802.

From these various memory units, processing unit(s) 812 retrieves instructions to execute and data to process in order to execute the processes of the subject disclosure. The processing unit(s) can be a single processor or a multi-core processor in different implementations.

ROM 810 stores static data and instructions that are needed by processing unit(s) 812 and other modules of the electronic system. Permanent storage device 802, on the other hand, is a read-and-write memory device. This device is a non-volatile memory unit that stores instructions and data even when electronic system 800 is off. Some implementations of the subject disclosure use a mass-storage device (such as a magnetic or optical disk and its corresponding disk drive) as permanent storage device 802.

Other implementations use a removable storage device (such as a floppy disk, flash drive, and its corresponding disk drive) as permanent storage device 802. Like permanent storage device 802, system memory 804 is a read-and-write memory device. However, unlike storage device 802, system memory 804 is a volatile read-and-write memory, such a random access memory. System memory 804 stores some of the instructions and data that the processor needs at runtime. In some implementations, the processes of the subject disclosure are stored in system memory 804, permanent storage device 802, and/or ROM 810. From these various memory units, processing unit(s) 812 retrieves instructions to execute and data to process in order to execute the processes of some implementations.

Bus 808 also connects to input and output device interfaces 814 and 806. Input device interface 814 enables the user to communicate information and select commands to the electronic system. Input devices used with input device interface 814 include, for example, alphanumeric keyboards and pointing devices (also called "cursor control devices"). Output device interfaces 806 enables, for example, the display of images generated by the electronic system 800. Output devices used with output device interface 806 include, for example, printers and display devices, such as cathode ray tubes (CRT) or liquid crystal displays (LCD). Some implementations include devices such as a touchscreen that functions as both input and output devices.

Finally, as shown in FIG. 8, bus 808 also couples electronic system 800 to a network (not shown) through a network interface 816. In this manner, the computer can be a part of a network of computers (such as a local area network ("LAN"), a wide area network ("WAN"), or an Intranet, or a network of networks, such as the Internet. Any or all components of electronic system 800 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's electronic device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to an electronic device (e.g., for purposes of displaying data to and receiving user input from a user interacting with the electronic device). Data generated at the electronic device (e.g., a result of the user interaction) can be received from the electronic device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for registering an electronic device, the method comprising:
    determining, based on hash information associated with an identifier for an electronic device, an auto-enrollment status of the electronic device by an enterprise;
    and in a case where the auto-enrollment status of the electronic device is determined to require auto-enrollment of the electronic device by the enterprise:
    identifying one or more configuration settings for the electronic device as designated by the enterprise;
    sending an indication of the auto-enrollment status to the electronic device; and
    requesting the electronic device to adopt the one or more configuration settings as designated by the enterprise; and
    in a case where the auto-enrollment status of the electronic device is determined not to require auto-enrollment of the electronic device by the enterprise:
    generating, based on the identifier of the electronic device and the hash information associated with the identifier, a response identifier for the electronic device; and
    transmitting the generated response identifier to the electronic device.

2. The computer-implemented method of claim 1, further comprising: providing for display, an auto-enrollment login interface if the electronic device is determined to require auto-enrollment of the electronic device by the enterprise.

3. The computer-implemented method of claim 2, further comprising: receiving, via the auto-enrollment login interface, a user authentication to initiate auto-enrollment of the electronic device by the enterprise, wherein requesting the electronic device to adopt the one or more configuration settings as designated by the enterprise is performed in response to receiving the user authentication.

4. The computer-implemented method of claim 1, wherein the one or more configuration settings are configured to modify hardware configurations of the electronic device.

5. The computer-implemented method of claim 1, wherein the one or more configuration settings are configured to modify software configurations of the electronic device.

6. The computer-implemented method of claim 1, wherein the hash information is generated by a secure hash algorithm.

7. A computer-implemented method for registering an electronic device, the method comprising:
   receiving an indication to configure an electronic device;
   providing hash information associated with an identifier for the electronic device to determine an auto-enrollment status of the electronic device by an enterprise;
   receiving an indication of the auto-enrollment status of the electronic device by the enterprise;
   in a case where the electronic device is indicated to require auto-enrollment of the electronic device by the enterprise:
   receiving one or more configuration settings as designated by the enterprise; and
   automatically configuring the electronic device based on the received one or more configuration settings as designated by the enterprise; and
   in a case where the auto-enrollment status of the electronic device is indicated to require auto-enrollment of the electronic device by a different enterprise:
   updating the identifier for the electronic device and the hash information associated with the identifier; and
   providing for the updated identifier for the electronic device and the hash information associated with the identifier to determine the auto-enrollment status of the electronic device.

8. The computer-implemented method of claim 7, further comprising: displaying an auto-enrollment login interface on the electronic device if the electronic device is indicated to require auto-enrollment by the enterprise.

9. The computer-implemented method of claim 8, further comprising: receiving, via the auto-enrollment interface, user authentication to initiate auto-enrollment of the electronic device by the enterprise, wherein automatically configuring the electronic device based on the received one or more configuration settings as designated by the enterprise is performed in response to receiving the user authentication.

10. The computer-implemented method of claim 7, further comprising: modifying hardware configuration settings of the electronic device based on the received one or more configuration settings as designated by the enterprise.

11. The computer-implemented method of claim 7, further comprising: modifying software configuration settings of the electronic device based on the received one or more configuration settings as designated by the enterprise.

12. The computer-implemented method of claim 7, wherein the hash information is generated by a secure hash algorithm.

13. A system for registering an electronic device, the system comprising:
   one or more processors; and
   a machine-readable medium comprising instructions stored therein, which when executed by the one or more processors, cause the system to perform operations comprising:
   determining, based on hash information associated with an identifier for an electronic device, an auto-enrollment status of the electronic device by an enterprise;
   in a case where the auto-enrollment status of the electronic device is determined to require auto-enrollment of the electronic device by the enterprise:
   identifying one or more configuration settings for the electronic device as designated by the enterprise;
   sending an indication of the auto-enrollment status to the electronic device; and
   requesting the electronic device to adopt the one or more configuration settings as designated by the enterprise; and
   in a case where the auto-enrollment status of the electronic device is determined not to require auto-enrollment of the electronic device by the enterprise:
   generating, based on the identifier of the electronic device and the hash information associated with the identifier, a response identifier for the electronic device; and transmitting the generated response identifier to the electronic device.

14. The system of claim 13, wherein the operations further comprising: providing for display an auto-enrollment login interface if the electronic device is determined to require auto-enrollment of the electronic device by the enterprise.

15. The system of claim 14, wherein the operations further comprising: receiving, via the auto-enrollment login interface, a user authentication to initiate auto-enrollment of the electronic device by the enterprise, wherein requesting the electronic device to adopt the one or more configuration settings as designated by the enterprise is performed in response to receiving the user authentication.

16. The system of claim 13, wherein the one or more configuration settings are configured to modify hardware configurations of the electronic device.

17. The system of claim 13, wherein the one or more configuration settings are configured to modify software configurations of the electronic device.

18. The system of claim 13, wherein the hash information is generated by a secure hash algorithm.

* * * * *